(12) United States Patent
Villarica et al.

(10) Patent No.: US 11,343,863 B2
(45) Date of Patent: May 24, 2022

(54) SYSTEM AND METHOD FOR COMMUNICATING ACROSS MULTIPLE NETWORK TYPES

(71) Applicant: VOYAGER INNOVATIONS HOLDINGS PTE. LTD., Singapore (SG)

(72) Inventors: Rodolfo Alberto Asuncion Villarica, Pasig (PH); Alex Dy Ibasco, Pasig (PH)

(73) Assignee: VOYAGER INNOVATIONS HOLDING PTE. LTD., Singapore (SG)

( * ) Notice: Subject to any disclaimer, the term of this patent is extended or adjusted under 35 U.S.C. 154(b) by 0 days.

(21) Appl. No.: 16/305,814

(22) PCT Filed: May 30, 2017

(86) PCT No.: PCT/SG2017/050276
§ 371 (c)(1),
(2) Date: Nov. 29, 2018

(87) PCT Pub. No.: WO2017/209693
PCT Pub. Date: Dec. 7, 2017

(65) Prior Publication Data
US 2020/0252772 A1 Aug. 6, 2020

(30) Foreign Application Priority Data

May 31, 2016 (SG) .......................... 10201604398W

(51) Int. Cl.
*H04W 76/11* (2018.01)
*H04W 48/18* (2009.01)
(Continued)

(52) U.S. Cl.
CPC .............. *H04W 76/11* (2018.02); *H04W 4/12* (2013.01); *H04W 4/60* (2018.02); *H04W 8/26* (2013.01);
(Continued)

(58) Field of Classification Search
CPC ......... H04W 76/10; H04W 4/12; H04W 8/26; H04W 4/60; H04W 76/11; H04W 40/02;
(Continued)

(56) References Cited

U.S. PATENT DOCUMENTS 8,412,192 B2 * 4/2013 Buckley ................... H04W 4/18
455/411
8,825,108 B2 * 9/2014 LaBauve ........... H04L 29/06027
455/552.1
(Continued)

FOREIGN PATENT DOCUMENTS

CN 102413453 A 4/2012
WO 2007047580 A2 4/2007
(Continued)

OTHER PUBLICATIONS

Extended European Search Report for EP 17807122.1—1214/3466188 PCT/SG2017/050276.
(Continued)

*Primary Examiner* — Magdi Elhag
(74) *Attorney, Agent, or Firm* — JCIP; Joseph G. Chu; Jeremy I. Maynard

(57) ABSTRACT

The present invention relates to a system and method for communicating across multiple network types. In particular, the system and method is suitable for, but not limited to, initiating communication through a suitable network based on a set of rules. Further, the system and method is suitable for, but not limited to, using a single number when deliv-
(Continued)

ering the communication to prevent recipients from confusing plural numbers of senders.

2 Claims, 9 Drawing Sheets

(51) Int. Cl.
| | |
|---|---|
| *H04W 4/60* | (2018.01) |
| *H04W 76/10* | (2018.01) |
| *H04W 4/12* | (2009.01) |
| *H04W 8/26* | (2009.01) |
| *H04W 40/02* | (2009.01) |

(52) U.S. Cl.
CPC .......... *H04W 40/02* (2013.01); *H04W 48/18* (2013.01); *H04W 76/10* (2018.02)

(58) Field of Classification Search
CPC ....... H04W 88/06; H04W 4/16; H04W 12/02; H04W 68/005; H04W 80/04; H04W 76/16; H04W 48/18; H04M 3/42059; H04M 15/8055; H04M 15/8061; H04M 1/2535; H04M 1/57
See application file for complete search history.

(56) References Cited

U.S. PATENT DOCUMENTS

| | | | | |
|---|---|---|---|---|
| 2003/0050047 | A1* | 3/2003 | Ala-Luukko | H04W 8/26 455/412.1 |
| 2005/0208938 | A1* | 9/2005 | Pecen | H04W 48/18 455/428 |
| 2005/0271011 | A1* | 12/2005 | Alemany | H04W 36/28 370/331 |
| 2006/0229078 | A1 | 10/2006 | Itzkovitz et al. | |
| 2007/0064607 | A1 | 3/2007 | Moon et al. | |
| 2009/0088198 | A1* | 4/2009 | Cheng | H04W 8/26 455/551 |
| 2013/0064141 | A1* | 3/2013 | Benyaminov | H04M 7/003 370/259 |
| 2014/0201293 | A1 | 7/2014 | Turakhia | |
| 2014/0335854 | A1 | 11/2014 | Labauve et al. | |
| 2015/0172884 | A1* | 6/2015 | Arazi | H04L 51/38 455/466 |
| 2016/0295346 | A1* | 10/2016 | Iwai | H04L 69/08 |

FOREIGN PATENT DOCUMENTS

| | | |
|---|---|---|
| WO | 2007047580 A3 | 4/2007 |
| WO | 2008109995 A1 | 9/2008 |
| WO | 2009124938 A2 | 10/2009 |

OTHER PUBLICATIONS

International Search Report, Written Opinion of International Search Authority, International Preliminary Report on Patentability of International Application No. PCT/SG2017/050276.

* cited by examiner

SYSTEM AND METHOD FOR COMMUNICATING ACROSS MULTIPLE NETWORK TYPES

FIELD OF INVENTION

The present invention relates to a system and method for communicating across multiple network types. The system and method are particularly relevant, but not limited to facilitate the multiple networks communication.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

The mobile technology has changed the world we live in as well as the communication method for users. Recent advancements in the mobile technology mean that mobile phones have moved well past just calling and messaging via circuit switched (CS) network such as global system for mobile communications (GSM), code division multiple access (CDMA), etc.—now users are able to call and message via internet protocol (IP) networks. For various reasons, the communication service via the IP network costs less than equivalent service via the CS network.

Accordingly, there are many calling and messaging applications using the IP network in the market today. Most of those applications allow users, who include subscribers and non-subscribers to the network, to call and message with each other, and many of the available applications also allow the users to call and message other subscribers in legacy CS communications networks such as GSM, CDMA, etc.

One of the existing applications provides its subscriber a virtual phone number that exists within a telecommunication company's numbering space. This allows the subscriber of the application to call and message with other subscribers in the legacy network using that virtual phone number.

For example, the application allows its subscriber to own a virtual phone number of the telecommunications company A (hereafter referred to as Telco A) so that the subscriber's family and friends using Telco A are able to call and message the subscriber using the subscriber's virtual phone number at local rates even though the subscriber had an original phone number assigned from another telecommunications company (e.g. Telco B).

These types of applications work well for off-net subscribers wishing to obtain service in another telco network. There is another scenario, wherein a subscriber of Telco A, wishes to use such an application in order to communicate with other subscribers of Telco A, where those subscribers may or may not have the application. However, one prevalent problem of those applications is their inability to use the subscriber's original phone number assigned from the original telecommunications company (e.g. Telco A) as primary means to contact to other subscribers. In those applications, the new virtual phone number is normally assigned to the subscriber after registering for the applications. In this scenario, the subscriber would actually have two phone numbers, the original phone number as well as a virtual phone number.

Specifically, from the point of view of an on-net subscriber, the virtual phone number may be sub-optimal because the on-net subscriber already has the original phone number assigned from the current/original telecommunications company (e.g. Telco A) and may be strongly associated with the original phone number. As the on-net subscriber is assigned the new virtual phone number, other subscribers such as his/her friends or family would need to remember and recognize the on-net subscriber's new virtual phone number, in addition to the original phone number.

From the point of view of an off-net subscriber who already has the original phone number assigned from the different/original telecommunications company, the off-net subscriber may require the virtual phone number assigned from the telecommunications company related to those applications (hereafter referred to as current telecommunications company) in order to communicate with other subscribers in the current communication network at a possibly lower rate. However, even in this case, other subscribers such as his/her friends or family would need to remember and recognize the off-net subscriber's new virtual phone number.

Meanwhile, another prevalent problem of those applications is inability to select dynamically the best transport network, i.e. whether the IP network or the CS network, for each and every call/message.

For reference, one of the existing VoIP servers allows the subscriber chooses whether his/her call/message service would be delivered over the IP network or the CS network, but not both. Once the choice is made, the service is only delivered in chosen type of transport network even though the quality of the chosen type is not good enough or non-existent. Therefore, the result provides poor user experience such as lost or dropped calls, bad voice quality, and delayed messaging, etc.

Therefore, there exists a need for a solution that does not necessitate learning a new phone number, but to further allow to select the best transport network, i.e. whether the IP network or the CS network for each and every call/message when using multiple network types.

SUMMARY OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

The present invention seeks to provide a service in that when sender requests a call/message, the recipient would only see a single phone number of the sender, even though the sender may in reality represent different phone numbers regarding each of circuit switched network and internet protocol network.

The present invention further seeks to provide a technical solution to select a suitable transport network for delivering calls/messages based on a set of rules.

In accordance with first aspect of the present invention there is a system for communicating across multiple networks comprising: an application provider operable to assign an identifier to a first device, wherein the first device is associated with a first identifier and is assigned a second identifier from the application provider; the first device operable to initiate a communication and select at least one first communication network among a plurality of first communication networks for establishing connection between the first device and a server so that the first device sends the communication to the server via the selected first communication network using the second identifier as a sender identifier; the server operable to replace the second identifier with the first identifier after receiving the communication from the first device, select at least one second communication network among a plurality of second communication networks connected between a second device and the server, and send the communication to the second device via the selected second communication network using the first identifier as the sender identifier; and the second device operable to receive the communication with the first identifier as the sender identifier from the server.

Preferably, the first device checks first communication network state among the plurality of first communication networks connected between the first device and the server, and the server checks second communication network state among the plurality of second communication networks connected between the second device and the server.

Preferably, the plurality of first and second communication networks include circuit switched (CS) network and internet protocol (IP) network.

Preferably, the first device checks IP network quality as the first communication network state and selects at least one of the IP network and the CS network depending on the checked IP network quality; and the server checks IP network quality as the second communication network state and selects at least one of the IP network and the CS network depending on the checked IP network quality.

Preferably, the server determines whether using the second identifier as the sender identifier depending on the selected first communication network.

Preferably, if the selected first communication network is the IP network, the first device sends the communication to the server via the IP network, and if the selected first communication network is the CS network, the first device sends the communication to the server via the CS network using the second identifier as the sender identifier.

Preferably, the first device requests to send a rich message, if the selected first communication network is the IP network, the first device sends the rich message to the server via the IP network, and if the selected first communication network is the CS network, the first device sends a simplified message corresponding to the rich message to the server via the CS network.

Preferably, if the selected second communication network is the IP network, the server sends the rich message to the second device via the IP network, and if the selected second communication network is the CS network, the server sends the simplified message corresponding to the rich message to the second device via the CS network.

Preferably, the server rechecks the second communication network state, and if reselected second communication network is the IP network, the server synchronizes to the second device to replace the simplified message with the rich message in the second device.

Preferably, the second device displays the first identifier as the sender identifier on a display.

Preferably, when the second device requests another communication, the second device selects the at least one second communication network among the plurality of second communication networks connected between the second device and the server, and the second device sends the another communication to the server via the selected second communication network using the first identifier as a recipient identifier.

Preferably, the server selects the at least one first communication network among the plurality of first communication networks connected between the first device and the server, and sends the another communication to the first device via the selected first communication network using the second identifier as the recipient identifier.

Preferably, the server determines whether using the second identifier as the recipient identifier depending on the selected first communication network.

Preferably, if the selected first communication network is the IP network, the server sends the another communication to the first device via the IP network, and if the selected first communication network is the CS network, the server sends the another communication to the first device via the CS network using the second identifier as the recipient identifier.

Preferably, the second device requests to send a rich message, if the selected second communication network is the IP network, the second device sends the rich message to the server via the IP network, and if the selected second communication network is the CS network, the second device sends a simplified message corresponding to the rich message to the server via the CS network.

Preferably, if the selected first communication network is the IP network, the server sends the rich message to the first device via the IP network, and if the selected first communication network is the CS network, the server sends the simplified message corresponding to the rich message to the first device via the CS network.

Preferably, the server rechecks the first communication network state, and if reselected first communication network is the IP network, the server synchronizes to the first device to replace the simplified message with the rich message in the first device.

Preferably, the first identifier is stored in connection with an international mobile subscriber identity (IMSI) of the first device in a home location register (HLR), and when the first device signs up to an application, the application provider assigns the second identifier and update the HLR so that the second identifier is stored in connection with the IMSI.

Preferably, the first identifier is a public number of the first device and the second identifier is a private number of the first device.

Preferably, the communication includes at least one of call and message.

In accordance with second aspect of the present invention there is a method for communicating across multiple networks comprising: initiating, by a first device, a communication, wherein the first device is associated with a first identifier and is assigned a second identifier from an application provider; selecting, by the first device, at least one first communication network among a plurality of first communication networks connected between the first device and a server; sending the communication from the first device to the server via the selected first communication network using the second identifier as a sender identifier; replacing, by the server, the second identifier with the first identifier; selecting, by the server, at least one second communication network among a plurality of second communication networks connected between a second device and the server; sending the communication from the server to the second device via the selected second communication network using the first identifier as the sender identifier; and receiving, by the second device, the communication with the first identifier as the sender identifier from the server.

Preferably, the first device checks first communication network state among the plurality of first communication networks connected between the first device and the server, and the server checks second communication network state among the plurality of second communication networks connected between the second device and the server.

Preferably, the plurality of first and second communication networks include circuit switched (CS) network and Internet protocol (IP) network.

Preferably, the first device checks IP network quality as the first communication network state, and selects at least one of the IP network and the CS network depending on the checked IP network quality; and the server checks IP network quality as the second communication network state and selects at least one of the IP network and the CS network depending on the checked IP network quality.

Preferably, the server determines whether using the second identifier as the sender identifier depending on the selected first communication network.

Preferably, if the selected first communication network is the IP network, the first device sends the communication to the server via the IP network, and if the selected first communication network is the CS network, the first device sends the communication to the server via the CS network using the second identifier as the sender identifier.

Preferably, the first device requests to send a rich message, if the selected first communication network is the IP network, the first device sends the rich message to the server via the IP network, and if the selected first communication network is the CS network, the first device sends a simplified message corresponding to the rich message to the server via the CS network.

Preferably, if the selected second communication network is the IP network, the server sends the rich message to the second device via the IP network, and if the selected second communication network is the CS network, the server sends the simplified message corresponding to the rich message to the second device via the CS network.

Preferably, the server rechecks the second communication network state, and if reselected second communication network is the IP network, the server synchronizes to the second device to replace the simplified message with the rich message in the second device.

Preferably, the second device displays the first identifier as the sender identifier on a display.

Preferably, when the second device requests another communication, the second device selects the at least one second communication network among the plurality of second communication networks connected between the second device and the server, and the second device sends the another communication to the server via the selected second communication network using the first identifier as a recipient identifier.

Preferably, the server selects the at least one first communication network among the plurality of first communication networks connected between the first device and the server, and sends the another communication to the first device via the selected first communication network using the second identifier as the recipient identifier.

Preferably, the server determines whether using the second identifier as the recipient identifier depending on the selected first communication network.

Preferably, if the selected first communication network is the IP network, the server sends the another communication to the first device via the IP network, and if the selected first communication network is the CS network, the server sends the another communication to the first device via the CS network using the second identifier as the recipient identifier.

Preferably, the second device requests to send a rich message, if the selected second communication network is the IP network, the second device sends the rich message to the server via the IP network, and if the selected second communication network is the CS network, the second device sends a simplified message corresponding to the rich message to the server via the CS network.

Preferably, if the selected first communication network is the IP network, the server sends the rich message to the first device via the IP network, and if the selected first communication network is the CS network, the server sends the simplified message corresponding to the rich message to the first device via the CS network.

Preferably, the server rechecks the first communication network state, and if reselected first communication network is the IP network, the server synchronizes to the first device to replace the simplified message with the rich message in the first device.

Preferably, the first identifier is stored in connection with an IMSI of the first device in a HLR, and when the first device signs up to an application, the application provider assigns the second identifier and update the HLR so that the second identifier is stored in connection with the IMSI.

Preferably, the first identifier is a public number of the first device and the second identifier is a private number of the first device.

Preferably, the communication includes at least one of call and message.

In accordance with third aspect of the present invention there is a communication facilitator for facilitating communication between parties across multiple networks, comprising: receiving a communication from a first device associated with a first identifier via a selected first communication network using a second identifier as a sender identifier, wherein the first device is assigned the second identifier from an application provider, and the selected first communication network is selected among a plurality of first communication networks connected between the first device and the communication facilitator by the first device; replacing the second identifier with the first identifier; selecting at least one second communication network among a plurality of second communication networks connected between a second device and the communication facilitator; and sending the communication to the second device via the selected second communication network using the first identifier as the sender identifier.

Preferably, the first device checks first communication network state among the plurality of first communication networks connected between the first device and the communication facilitator, and the communication facilitator checks second communication network state among the plurality of second communication networks connected between the second device and the communication facilitator.

Preferably, the plurality of first and second communication networks include CS network and IP network.

Preferably, the first device checks IP network quality as the first communication network state and determines at least one of the IP network and the CS network depending on the checked IP network quality; and the communication facilitator checks IP network quality as the second communication network state and determines at least one of the IP network and the CS network depending on the checked IP network quality.

Preferably, the communication facilitator determines whether using the second identifier as the sender identifier depending on the selected first communication network.

Preferably, if the selected first communication network is the IP network, the communication facilitator receives the communication from the first device via the IP network, and if the selected first communication network is the CS network, the communication facilitator receives the communication from the first device via the CS network using the second identifier as the sender identifier.

Preferably, the communication facilitator receives a request for sending a rich message, if the selected first communication network is the P network, the communication facilitator receives the rich message from the first device via the IP network, and if the selected first communication network is the CS network, the communication facilitator receives a simplified message corresponding to the rich message from the first device via the CS network.

Preferably, if the selected second communication network is the IP network, the communication facilitator sends the rich message to the second device via the IP network, and if the selected second communication network is the CS network, the communication facilitator sends the simplified message corresponding to the rich message to the second device via the CS network.

Preferably, the communication facilitator rechecks the second communication network state, and if reselected second communication network is the IP network, the communication facilitator synchronizes to the second device to replace the simplified message with the rich message in the second device.

Preferably, when the communication facilitator receives a request for an another communication from the second device, the second device selects the at least one second communication network among the plurality of the second communication networks connected between the second device and the communication facilitator, and the communication facilitator receives the another communication from the second device via the selected second communication network using the first identifier as a recipient identifier.

Preferably, the communication facilitator selects the at least one first communication network among the plurality of the first communication networks connected between the first device and the communication facilitator, and sends the another communication to the first device via the selected first communication network using the second identifier as the recipient identifier.

Preferably, the communication facilitator determines whether using the second identifier as the recipient identifier depending on the selected first communication network.

Preferably, if the selected first communication network is the IP network, the communication facilitator sends the another communication to the first device via the IP network, and if the selected first communication network is the CS network, the communication facilitator sends the another communication to the first device via the CS network using the second identifier as the recipient identifier.

Preferably, the communication facilitator receives a request for sending a rich message from the second device, if the selected second communication network is the IP network, the communication facilitator receives the rich message from the second device via the IP network, and if the selected second communication network is the CS network, the communication facilitator receives a simplified message corresponding to the rich message from the second device via the CS network.

Preferably, if the selected first communication network is the IP network, the communication facilitator sends the rich message to the first device via the IP network, and if the selected first communication network is the CS network, the communication facilitator sends the simplified message corresponding to the rich message to the first device via the CS network.

Preferably, the communication facilitator rechecks the first communication network state, and if reselected first communication network is the IP network, the communication facilitator synchronizes to the first device to replace the simplified message with the rich message in the first device.

Preferably, the first identifier is stored in connection with an IMSI of the first device in a HLR, and when the first device signs up to an application, the application provider assigns the second identifier and update the HLR so that the second identifier is stored in connection with the IMSI.

Preferably, the first identifier is a public number of the first device and the second identifier is a private number of the first device.

Preferably, the communication includes at least one of call and message.

In accordance with fourth aspect of the present invention there is a non-transitory computer readable medium containing executable software instructions thereon wherein when installed and executed on a mobile device of a user for facilitating communication between parties in multi-network, performs a method comprising the steps of: initiating a communication, wherein the mobile device is associated with a first identifier and is assigned a second identifier from an application provider; selecting at least one first communication network among a plurality of first communication networks connected between the mobile device and a server; sending the communication from the mobile device to the server via the selected first communication network using the second identifier as a sender identifier; sending an instruction to the server to replace the second identifier with the first identifier; sending an instruction to the server to select at least one second communication network among a plurality of second communication networks connected between a second device and the server; and sending an instruction to the server to send the communication from the server to the second device via the selected second communication network using the first identifier as the sender identifier.

Other aspects of the invention will become apparent to those of ordinary skill in the art upon review of the following description of specific embodiments of the invention in conjunction with the accompanying figures or by combining the various aspects of invention as described above.

BRIEF DESCRIPTION OF THE DRAWINGS

The present invention will now be described, by way of example only, with reference to the accompanying drawings, in which.

DESCRIPTION OF EMBODIMENTS OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including" will be understood to imply the inclusion of a stated integer or group of integers but not the exclusion of any other integer or group of integers.

Figure 1:
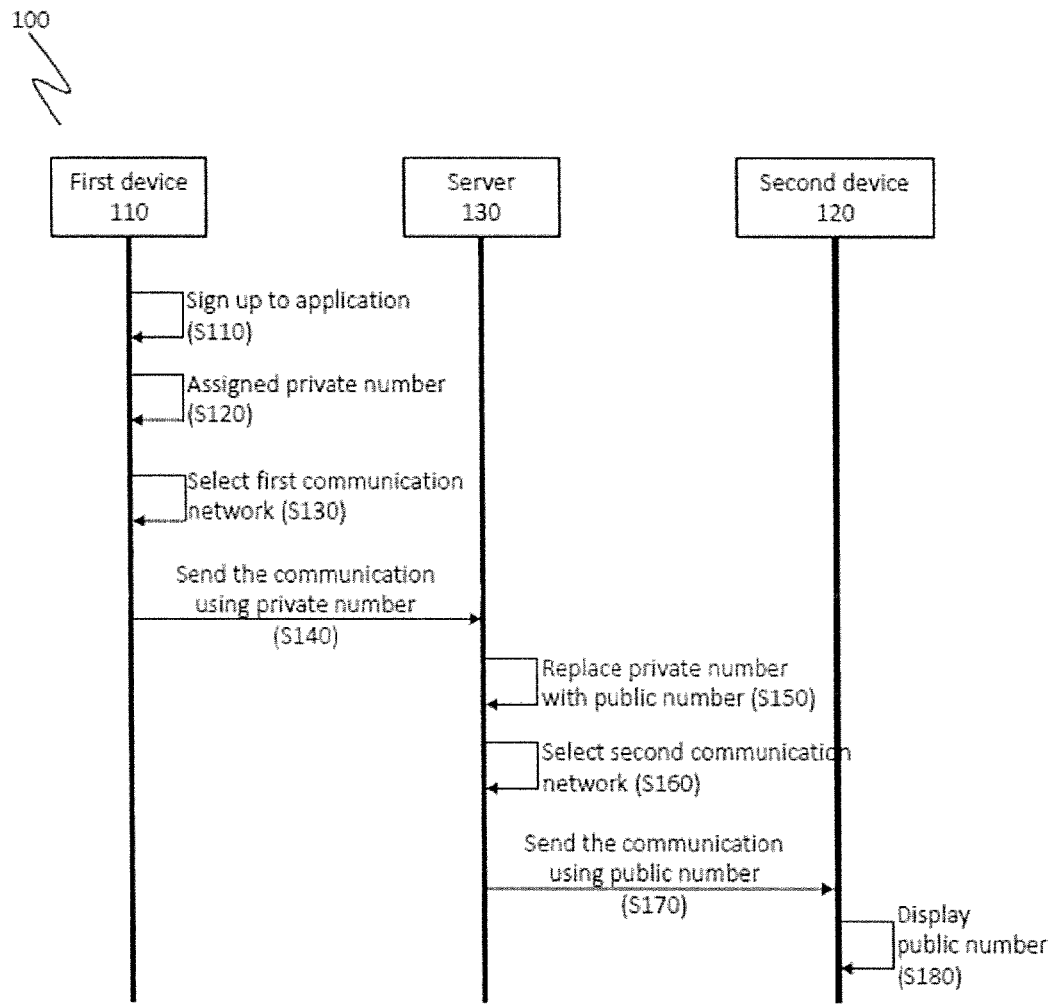
FIG. 1 illustrates a simplified flow diagram of communicating across multiple networks when a sender is a subscriber of an application in accordance with an embodiment of the invention.

FIG. 1 illustrates a simplified flow diagram of communicating across multiple networks when a sender is a subscriber of an application in accordance with an embodiment of the invention. More detailed flow diagrams regarding the FIG. 1 are described in FIG. 2 and FIG. 3.

In accordance with an embodiment of the invention and as shown in the FIG. 1, there is a system 100 for communicating across multiple networks between two devices (hereafter referred to as a first device 110 and a second device 120). The system 100 includes the first device 110, the second device 120, the server 130, and an application provider (not shown). The application provider provides an application or a service related to the present invention. The application is installable on at least one of the first device 110 and the second device 120. The application provider may include at least one application server and application database. The application provider may be located remotely or independent from the server 130. However, in some embodiments, the application provider may be the server 130.

The first device 110 and the second device 120 communicate with each other via the server 130. It may be appreciated that the first device 110 and the second device 120 may refer to, but not limited to the following devices: mobile phone, tablet, laptop and computer. The term 'communicating' includes at least one of calling and messaging.

The first device 110 and the server 130 are connected (either remotely or wired, hereinafter referred to as 'data communication') via at least one communication network (hereafter referred to as first communication network). Further, the second device 120 and the server 130 are in data communication via at least one communication network (hereafter referred to as second communication network). The first communication network and the second communication network include circuit switched (CS) network, internet protocol (IP) network or both CS and IP networks.

Referring to the FIG. 1, the first device 110 is already associated with a first identifier via for example, a prior registration process. The first identifier may include at least one of an identification (hereafter referred to as a public ID) and an original phone number (hereafter referred to as a public number). The public ID and the public number are known to the public such as friends and family. For example, the first device 110 may be a subscriber of current telecommunications company A. In this case, the public number is related to a telecommunications company A. On the other hand, the first device 110 may be a subscriber of different telecommunications company, e.g. a telecommunications company B. In this case, the public number is related to the different telecommunications company B. In other words, wherever the first device 110 is located in, the public number is the original phone number assigned from the original telecommunications company.

Although not shown in the FIG. 1, a home location register (HLR) is a central database maintained by a network operator, such as a telecommunications company, that contains details of each mobile phone subscriber. The HLR stores an international mobile subscriber identity (IMSI) of a SIM card that is installed on the subscriber's mobile phone and a mobile identification number (MIN) that is derived from a subscriber's phone number, and they are associated with each other.

Therefore, the HLR has stored the public number of the first device 110 associated with an IMSI of the first device 110, more specifically, the IMSI of a SIM card that is installed on the first device 110.

The user (hereafter referred to as a first user) is able to subscribe or sign up to the application or the service of the present invention. The first device 110 signs up to the application by the first user's input (S110). When signing up to the application, the first user may input the public number of the first device 110.

After that, the application provider, e.g. a server of the application or a database of the application, assigns a second identifier to the first device 110 (S120).

The second identifier may include at least one form of identification (hereafter referred to as a private ID) and a virtual number (hereafter referred to as a private number). The private ID and the private number are not revealed to public. The private number may be related to the current telecommunications company. In this case, the private number may follow number series or numbering rule of the current telecommunications company. The current telecommunications company may be related to the service/application provider company or an associate company. Meanwhile, the first device 110 may be a subscriber of another telecommunications company B and obtain the private number related to the current telecommunications company A. The private number may be related to the current location of the first device 110. In this case, the private number may follow number series or numbering rule of the country/state including the current location.

For example, with regard to the telecommunications company A, most phone numbers are 09xx xxx xxxx (11 digits), and the application provider allocates 08xx xxx xxxx (11 digits) number series as the private number.

Further, although not shown, the first user may select a country/state or a telecommunications company and the first device 110 may get the private number based on the first user's selection.

After creating the private number, the HLR record is updated by the application provider. In other words, the first device's old HLR record is updated such that it now has the private number. Therefore, the HLR stores the private number associated with the IMSI of the first device 110, more specifically, the IMSI of a SIM card that is installed on the first device 110. Furthermore, a new HLR record is created for the public number. The new HLR record includes the public number associated with a new IMSI. The new IMSI is not necessarily associated with a real SIM card. Therefore, the first device 110 has two HLR records.

The public number and the private number are related to each other (one-to-one), but the relationship is not necessarily stored in the HLR. The relationship may be stored in a separate database or across a plurality of databases.

Thereafter, the first device 110 selects at least one the first communication network connected between the first device 110 and the server 130 (S130). As described above, the plurality of first communication networks may include the CS network and the IP network. For example, the first device 110 checks the IP network quality. The checking step may include checking whether the IP network quality is existent and/or good enough for a predetermined time.

If the IP network is found to be in existence or is of a good enough quality to deliver the communication via the IP network, the first device 110 selects the IP network. On the other hand, if the IP network quality is found to be in non-existence or not good enough to deliver the communication via the IP network, the first device 110 selects the CS network.

Meanwhile, if the both of CS network quality and the IP network quality are good enough, the first device 110 is able to initiate a quick test. The quick test may include at least one of latency, bandwidth, jitter, price, and packet loss test. In the performance of the quick test, the first device 110 is able to access/refer to a database of prior communications that had a relative indicator for quality. For example, if there are certain areas where data quality is known to be poor, that could be added to the database and used to select the CS network or the IP network.

Although not shown in the FIG. 1, the first device 110 may select both of the CS network and the IP network to deliver the communication. In this case, the first device 110 would send the communication to the server 130 via both of the CS network and the IP network.

In another embodiments, although not shown, the server 130 may select at least one first communication network connected between the first device 110 and the server 130. Specifically, the first device 110 may request a communication to the server 130 to communicate with the second device 120. Thereafter, the server 130 may check first communication network state among a plurality of first communication networks and select the at least one first communication network.

After the first communication network is selected, the first device 110 sends the communication to the server 130 using the private number as a sender number (S140). The first device 110 sends the communication to the server 130 via the CS network using the private number, which is enabled.

Meanwhile, the server 130 may determine whether using the private number as the sender number depending on the selected first communication network. More specifically, if the first device 110 selects the IP network, the first device 110 sends the communication to the server 130 via the IP network. In this case, the first device 110 may not use the private number, but use the public number as the sender number. On the other hand, if the first device 110 selects the CS network, the first device 110 sends the communication to the server 130 via the CS network. In this case, the first device 110 uses the private number as the sender number.

The server 130 receives the communication from the first device 110, and then, replaces the private number with the public number (S150). Therefore, the private number would be masked.

The server 130 selects at least one second communication network connected between the second device 120 and the server 130 (S160). Specifically, the server 130 checks the second communication network state among a plurality of second communication networks including the CS network and the IP network. Similarly, the server 130 checks whether the IP network quality is existent/good enough to deliver the communication via the IP network. The server 130 selects at least one of the CS network and the IP network depending on the checked IP network quality.

Meanwhile, if both of the CS network quality and the IP network quality are good enough, the server 130 is able to initiate a quick test to select at least one of the CS network and the IP network. It is possible to select both of the CS network and the IP network to deliver the communication. In this case, the server 130 would send the communication to the second device 120 via both of the CS network and the IP network.

The server 130 sends the communication to the second device 120 using the public number as the sender number (S170). The second device 120 receives the communication with the public number as the sender number from the server 130.

Therefore, the second device 120 is able to recognize that the sender of the communication is the first device 110 having the public number. The second device 120 displays the public number as the sender number on a display of the second device 120 (S180).

More specifically, although not shown in the FIG. 1, when the second device 120 receives a call from the first device 110 through the server 130, an incoming call screen with the public number as the caller's number (caller ID) is displayed on the call screen. Further, at least one of the first user's name, nickname, photo and any other information stored associated with the public number is displayed with/on the incoming call screen. The private number is not shown in the second device 120. The user of the second device 120 (hereafter referred to as a second user) is unable to see the private number of the first device 110.

As described above, the present invention's sender is able to deliver his/her calls/messages using a suitable transport network. Further, the present invention is able to deliver his/her calls/messages even when the CS signal is weak or non-existent, or when outside of the original telecommunications company's country without incurring roaming costs. Therefore, the present invention is able to save time and cost.

Moreover, the present invention's recipient is able to only see a single number of the sender whether the sender is IP-reachable or not, and whether the sender uses a native dial/application of the mobile device or the application of the present invention. Therefore, the present invention is able to make the user experience as seamless as possible.

Figure 2:
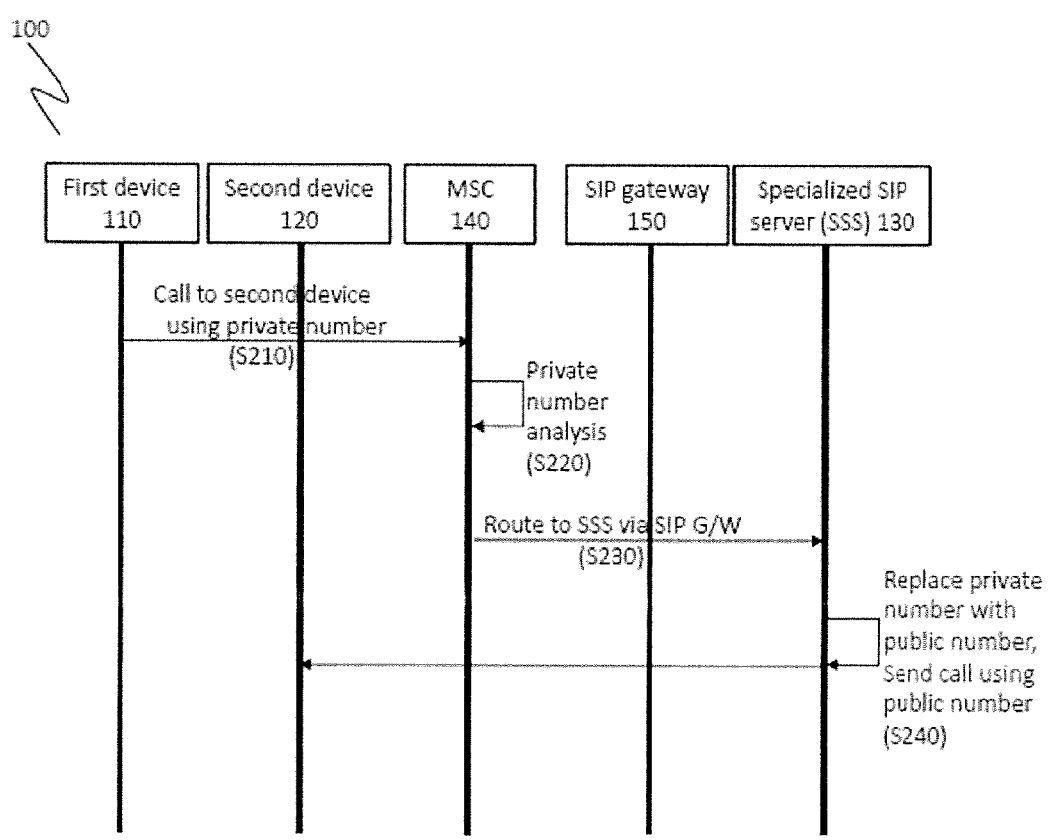
FIG. 2 illustrates a detailed flow diagram of calling across multiple networks when a sender is a subscriber of an application in accordance with an embodiment of the invention.

FIG. 2 illustrates a detailed flow diagram of calling across multiple networks when a sender is a subscriber of an application in accordance with an embodiment of the invention.

Referring to the FIG. 2, the specialized SIP server (SSS) is the server 130. The selected first communication network connected between the first device 110 and the server 130 is the CS network.

A mobile switching centre (MSC) 140 is the primary service delivery node for global system for mobile communications (GSM) and code division multiple access (COMA), responsible for routing voice calls and messages. A session initial protocol gateway (SIP gateway, SIP G/W) 150 is used to interface a SIP network to other networks.

When the first device 110 sends an outgoing call using the CS network (S210), the private number is used as the sender number. The MSC 140 and/or signal transfer points (STP) analyse the private number (S220), and route to specialized SIP server 130 via the SIP gateway 150 (S230). That is, the outgoing call is forced through the SIP gateway 150 (SIP trunk) and sent to the specialized SIP server 130 using SIP signalling.

When the outgoing call is received by the specialized SIP server 130, which may comprise at least one database (not shown), internal database logic running in the specialized SIP server 130 locates the public number of the first device 110 and replaces the private number with the public number. After that, the special SIP server 130 sends the call to the second device 120 via the IP network using the public number. Otherwise, the special SIP server 130 sends the call back into the CS network via the SIP trunk using the public number (S240).

In summary, before the specialized SIP server 130 receives the outgoing call, the system 100 used the private number. After the specialized SIP server 130 receives the outgoing call, the private number is replaced with the public number, and the public number would be used from now on.

Meanwhile, rating and charging are able to be performed by the specialized SIP server 130. Because the specialized SIP server 130 is a centre for all transactions, and the specialized SIP server 130 knows how the transactions were originated, i.e. via the CS network or the IP network. For example, it is possible to charge the first device 110 if a call is originated via the CS network and terminated via the IP network, but not charge the first device 110 if a call is originated via the IP network and terminated via the IP network.

Figure 3:
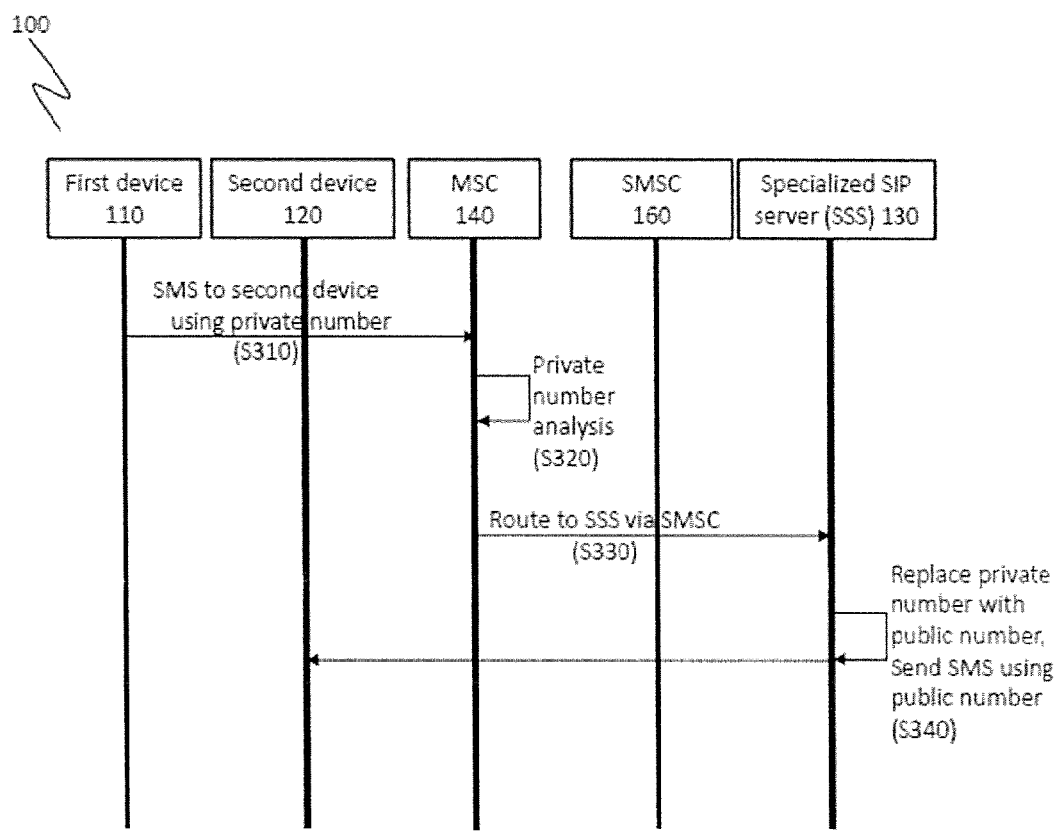
FIG. 3 illustrates a detailed flow diagram of messaging across multiple networks when a sender is a subscriber of an application in accordance with an embodiment of the invention.

FIG. 3 illustrates a detailed flow diagram of messaging across multiple networks when a sender is a subscriber of an application in accordance with an embodiment of the invention.

Referring to the FIG. 3, the specialized SIP server (SSS) is the server 130. The selected first communication network connected between the first device 110 and the server 130 is the CS network.

A short message service centre (SMSC) 160 is a network element in the mobile telephone network and its purpose is to store, forward, convert and deliver short message service (SMS) messages.

When the first device 110 sends an outgoing SMS using the CS network (S310), the private number is used as the sender number. The MSC 140 analyses the private number (S320), and route to specialized SIP server 130 via the SMSC 160 (S330). That is, the outgoing message is redirected into the SMSC 160 that is connected to the specialized SIP server 130.

Using short message peer-to-peer (SMPP) or some similar protocol, the specialized SIP server 130 retrieves the outgoing SMS, and performs the database lookup. Moreover, the specialized SIP server 130 locates the public number of the first device 110, and replaces the private number that was used in the outgoing SMS with the public number of the first device 110 before sending the SMS to the second device 120. After that, the specialized SIP server 130 sends the SMS to the second device 120 using the public number of the first device 110 (S340).

Accordingly, in both outgoing call and SMS, by performing the number masking, the private number of the first device 110 is never revealed to the public and even other telecommunications company. Any time the second device 120 receives a call or SMS from the first device 110, only the public number of the first device 110 is visible.

Figure 4:
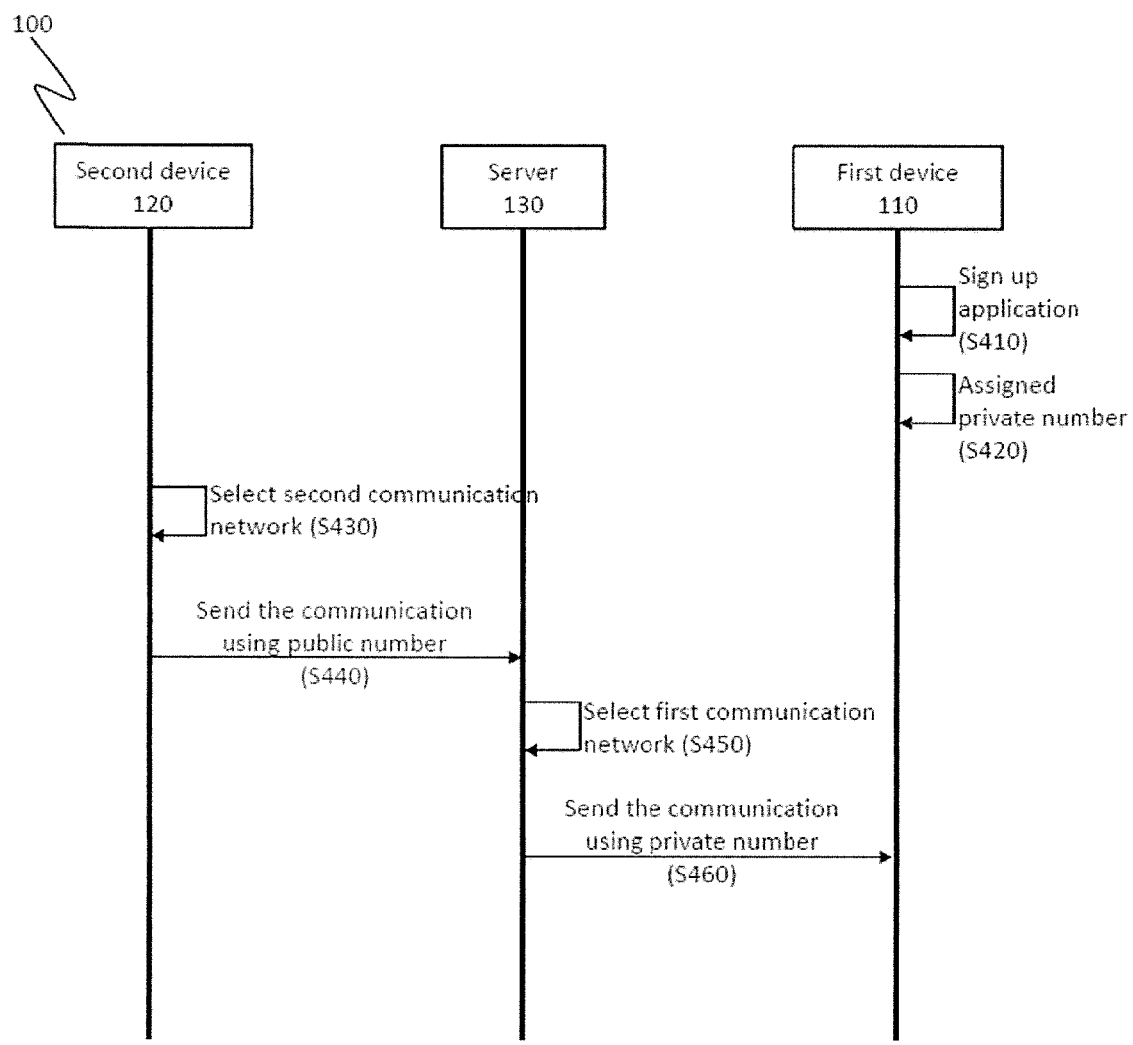
FIG. 4 illustrates a simplified flow diagram of communicating across multiple networks when a recipient is a subscriber of an application in accordance with another embodiment of the invention.

FIG. 4 illustrates a simplified flow diagram of communicating across multiple networks when a recipient is a subscriber of an application in accordance with another embodiment of the invention. More detailed flow diagrams regarding the FIG. 4 are described in FIG. 5 and FIG. 6.

Referring to the FIG. 4, the first device 110 is already associated with an original phone number (hereafter referred to as a public number) assigned from the original telecommunications company. The public number is stored associated with information, e.g. IMSI, of the first device 110 in the HLR.

The first user is able to sign up to the application or the service of the present invention. The first device 110 signs up to the application (S410) and the application provider assigns a private number to the first device 110 (S420). The private number may be related to the current telecommunications company or current located country as described above. Furthermore, the HLR record is updated as described above.

Thereafter, the second device 120 selects at least one second communication network connected between the second device 120 and the server 130 (S430). Specifically, the second device 120 checks second communication network state, e.g. IP network quality, among a plurality of second communication networks, e.g. CS network and IP network.

If the IP network is found to be in existence or the quality good enough to deliver the communication via the IP network, the second device 120 selects the IP network. On the other hand, if the IP network quality is found to be in non-existence or not good enough to deliver the communication via the IP network, the second device 120 selects the CS network. Meanwhile, if both of the CS network quality and the IP network quality are good enough, the second device 120 is able to initiate a quick test as described above.

After that, the second device 120 sends the communication to the server 130 via the selected second communication network using the public number as a recipient number (S440). The server 130 receives the communication from the second device 120.

The server 130 selects at least one first communication network connected between the first device 110 and the server 130 (S450). Specifically, the server 130 checks first communication network state among a plurality of first communication networks including the CS network and the IP network. The server 130 selects at least one of the CS network and the IP network depending on the checked IP network quality or quick test result.

The server 130 sends the communication to the first device 110 via the selected first communication network using the private number as the recipient number (S460). The second device 120 receives the communication from the server 130.

Meanwhile, the server 130 may determine whether using the private number as the recipient number depending on the selected first communication network. More specifically, if the server 130 selects the IP network, the server 130 sends the communication to the first device 110 via the IP network. In this case, the server 130 may not use the private number, but use the public number as the recipient number. On the other hand, if the server 130 selects the CS network, the server 130 sends the communication to the first device 110 via the CS network. In this case, the server 130 uses the private number as the recipient number.

Figure 5:
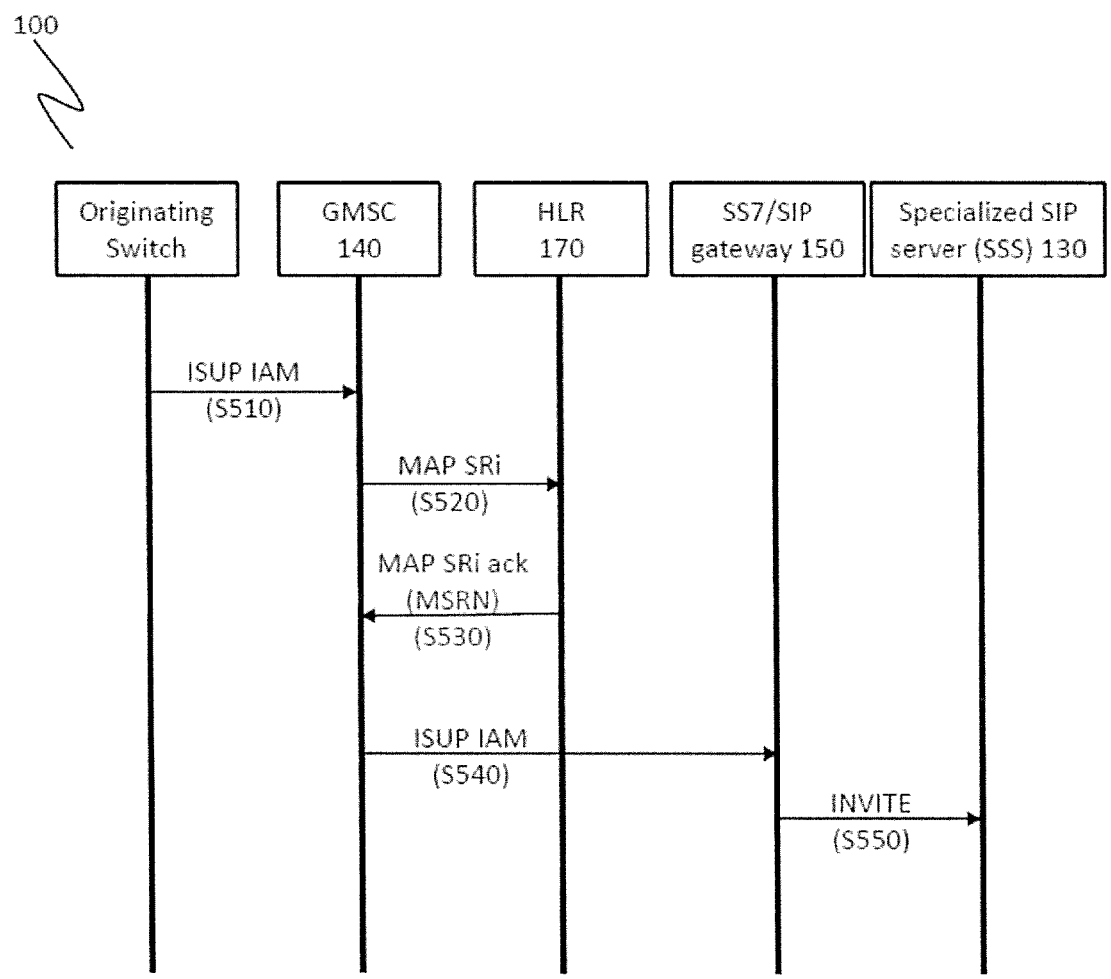
FIG. 5 illustrates a detailed flow diagram of calling across multiple networks when a recipient is a subscriber of an application in accordance with another embodiment of the invention.

FIG. 5 illustrates a detailed flow diagram of calling across multiple networks when a recipient is a subscriber of an application in accordance with another embodiment of the invention.

Specifically, the FIG. 5 illustrates that the first device (not shown) 110 receives an incoming call from the second device (not shown) 120. Referring to the FIG. 5, the MSC (or gateway MSC, GMSC) 140 is received an incoming call destined for the public number of first device 110 (S510). When the MSC 140 needs to route the incoming call, the MSC 140 sends a request to HLR 170 (S520). After that, the HLR 170 responds immediately to the MSC 140 (S530).

After that, the incoming call is forced to go through the SS7/SIP gateway 150 (i.e. a SIP trunk) (S540) and then sent to the specialized SIP server 130 via SIP network (S550).

When the incoming call is received by the specialized SIP server 130, any number of things can be done to the call. First, the specialized SIP server 130 is able to attempt to contact the client app, i.e. the application of the present invention, of the first device 110 via IP network. If the specialized SIP server 130 is able to reach the application and the IP network is voice capable, the call is delivered via the IP network to the application. On the other hand, if the specialized SIP server 130 is unable to reach the application via the IP network or the IP network is not voice capable, the specialized SIP server 130 is able to choose to deliver the call via the CS network to the private number of the first device 110. The specialized SIP server 130 routes the call via a SIP trunk to the private number of the first device 110.

Meanwhile, the specialized SIP server 130 is also able to apply many personalization rules to incoming calls: block a call, send the call to voicemail, etc. for handling the call. Accordingly, the present invention is able to direct the call through the CS network to the private number of the first device 110 or through the IP network to the application of the first device 110, or any combination thereof.

Figure 6:
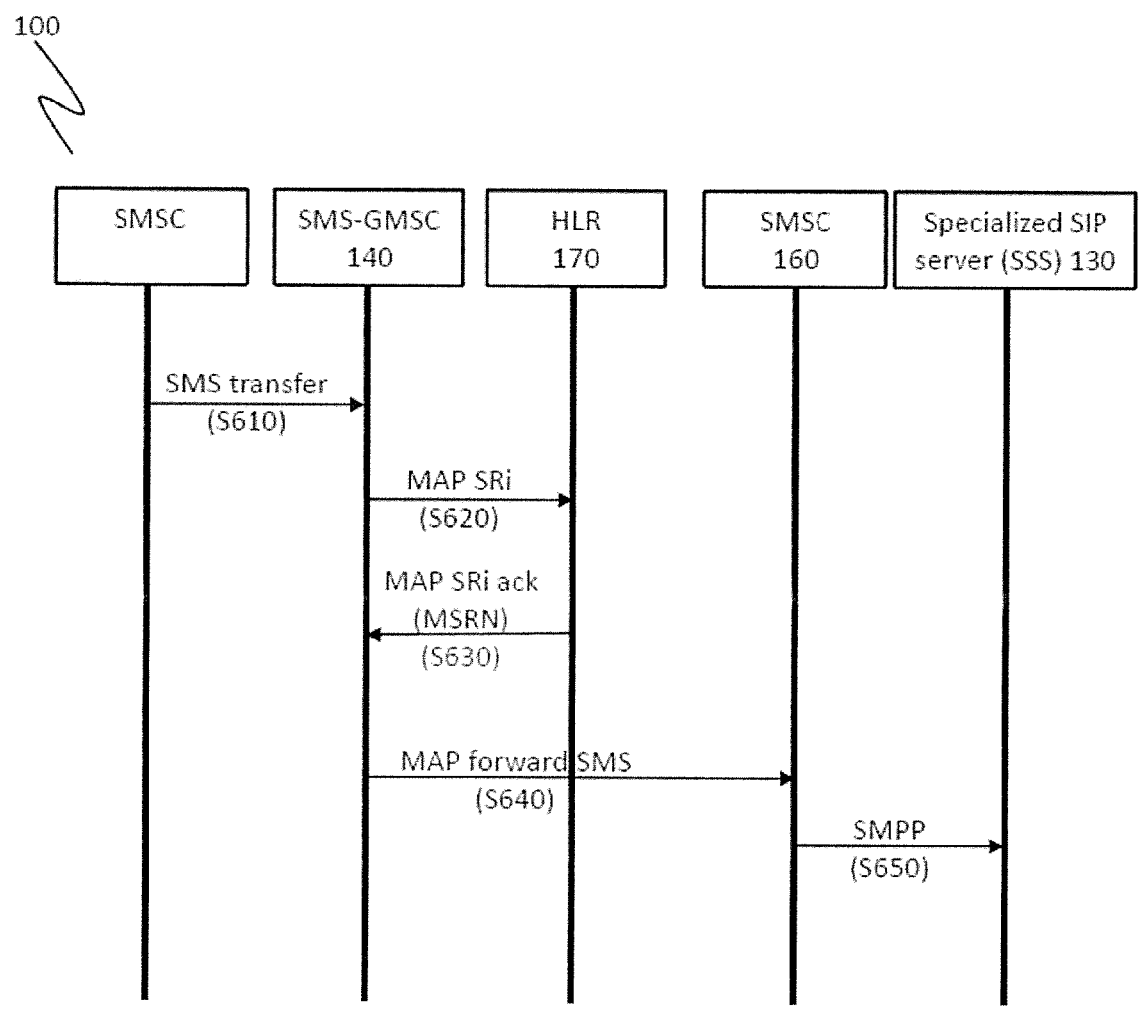
FIG. 6 illustrates a detailed flow diagram of messaging across multiple networks when a recipient is a subscriber of an application in accordance with another embodiment of the invention.

FIG. 6 illustrates a detailed flow diagram of messaging across multiple networks when a recipient is a subscriber of an application in accordance with another embodiment of the invention.

Specifically, the FIG. 6 illustrates that the first device (not shown) 110 receives an SMS from the second device (not shown) 120. Referring to the FIG. 6, the MSC (or an SMS gateway MSC, SMS-GMSC) 140 is received an incoming SMS destined for the public number of first device 110 (S610). When the MSC 140 needs to route the incoming SMS, the MSC 140 sends a request to HLR 170 (S620). After that, the HLR 170 responds immediately to the MSC 140 (S630).

After that, the incoming SMS is forced to go to a specific SMSC 180 (S640) and will then go to via any number of protocols, e.g. short message peer-to-peer (SMPP), to the specialized SIP server 130 (S650).

When the SMS is received by the specialized SIP server 130, any number of things can be done to the SMS. First, the specialized SIP server 130 is able to attempt to deliver the message to the application of the first device 110 via the IP network. If the specialized SIP server 130 is unable to reach the application via the IP network, the specialized SIP server 130 is able to choose to deliver the SMS via the CS network to the private number of the first device 110. The specialized SIP server 130 routes the SMS via any number of protocols, e.g. SMPP, to the private number of the first device 110.

The specialized SIP server 130 is also able to apply many personalization rules to incoming SMS: block the SMS, send the SMS as email, etc. for handling the SMS.

Accordingly, the present invention is able to direct the SMS through the CS network to the private number of the first device 110 or through the IP network to the application of the first device 110, or any combination thereof.

Although not shown, furthermore, the system 100 of the present invention handles rich communication between the first device 110 and the second device 120 that are running the application of the present invention. The rich communication may be in the form of a rich message which includes at least one of long text message, photo message, video message, voice message and emoticon.

In this case, the first device 110 sends a rich message to the public number of the second device 120, and the rich message is delivered to the server 130. If the first device 110 is IP-reachable, the rich message is delivered to the server 130 via the IP network. If the first device 110 is not IP-reachable, a simplified message of the rich message is delivered to the server 130 via the CS network (SMS). If the second device 120 is IP-reachable, the rich message is delivered to the second device 120 from the server 130 via the IP network. On the other hand, if the second device 120 is not IP-reachable, the simplified message of the rich message is delivered to the second device 120 from the server 130 via the CS network. If both of the first device 110 and the second device 120 are IP-reachable, the full message, i.e. the rich message, is delivered from the first device 110 to the second device 120, and any simplified message is replaced with the rich message. The application provider is able to simplify the rich message.

In other words, the server 130 operates to recheck whether the first or second communication networks are IP-reachable or not. If the server 130 reselects the IP network as the second communication network connected between the second device 120 and the server 130, i.e. the second device 120 is IP-reachable, the server 130 synchronizes to the application of the second device 120 and the simplified message is replaced with or converted back to the rich message in the application. Then, the simplified message is deleted and the rich message is displayed in the display of the second device 120

Meanwhile, when the first device 110 is not IP-reachable and the second device 120 is IP-reachable, the second device 120 would only receive the rich message as soon as the first device 100 is also IP-reachable. Since the system 100 delivers only the simplified message from the first device 110, the second device 120 only get the simplified message. Further, if the first device 110 is IP-reachable, the rich message and the simplified message corresponding to the rich message are delivered to the server 130 and the server 130 stores those messages.

In addition to the synchronization described above, since synchronization of the application happens when IP-reachability exists, all communications, e.g. messages, sent and received by the native text messaging application will still appear in the application of the present invention. This is possible because the all messages sent and received by the native text messaging application end up at the server 130 of the present invention, which is able to store those messages for when the first device 110 and the second device 120 are IP-reachable. The server 130 stores the rich message and the simplified message corresponding to the rich message on the same database.

In the above description, most of situations are described as whether IP-reachable or not. However, the present invention is able to apply to any other situations regarding whether rich messaging capable or not. For example, the 'other situation' includes where the first device 110 or the second device 120 are not smart phones. In this case, if one of them is not a smart phone, the first user of the first device 110 and the second user of the second device 120 only communicate with simplified messages. However, the server 130 stores any and all rich messages so that if one of the users would upgrade to a smart phone, e.g. buy the smart phone, upgrade software, the entire messages, i.e. including rich messages, will be synchronized to the one of them.

Figure 7:
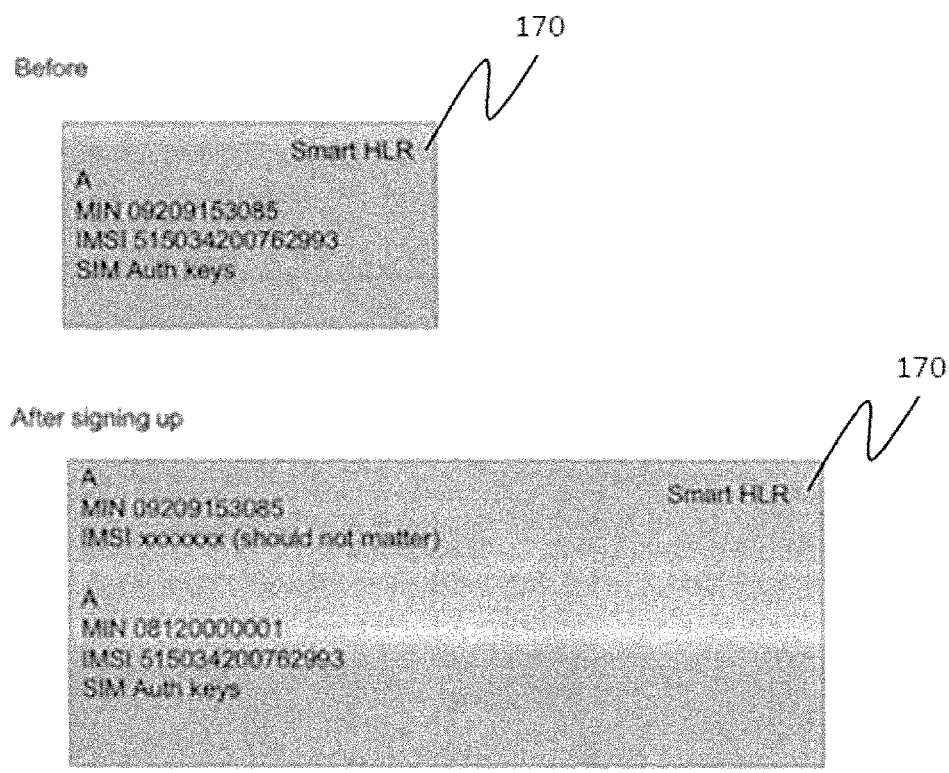
FIG. 7 illustrates an example of updating a HLR record.

FIG. 7 illustrates an example of updating a HLR record.

As described above, the first device 110 is able to have two phone numbers, i.e. the public number and the private number. The public number would be 'one number' of the first device 110.

Before the first device 110 signs up to the application of the present invention, the first device 110 has only one HLR record for a pair of the public number, e.g. 09209153085 and an IMSI of the SIM card in the first device 110, e.g. 515034200762993.

After the first device 110 signs up to the application, the application provider in the system 100 allocates the private number and update the HLR record. Specifically, the old HLR record will be updated such that it now includes a pair of the private number, e.g. 08120000001 and the IMSI of the SIM card installed on the first device 110, e.g. 515034200762993. Further, a new HLR record is created for the public number. The new HLR record includes a pair of the public number, e.g. 08120000001 and a new IMSI. The new IMSI does not need to be real, and is a telecommunications company resolvable IMSI that is not necessarily associated with a real SIM card. Therefore, the first device 110 has two HLR records.

The public number and the private number are related to each other (one-to-one), but the relationship is not necessarily stored on the HLR 170. The relationship may be stored in a separate database or across a plurality of databases.

Meanwhile, although not shown, the present invention is able to apply multi-SIM device, e.g. dual-SIM mobile phone.

Specifically, the first device 110 has a first SIM card assigned a first public number and a second SIM card assigned a second public number. Then, the first public number is stored in accordance with a first IMSI, i.e. the first IMSI is related to the first SIM card in a first HLR 171. Further, the second public number is stored with a second IMSI in a second HLR 172.

The first and the second HLRs 171, 172 may be different, because the first telecommunications company for the first SIM card and the second telecommunications company for the second SIM card are likely to be different. However, in some embodiments, the first public number with the first IMSI and the second public number with the second IMSI may be stored together in the same HLR 170.

If the first device 110 signs up to the application using the first SIM card, then the application provider allocates a first private number. After that, the first device 110 signs up to the application using the second SIM card, the application provider may allocate same private number, i.e. the first private number. Otherwise, the application provider may allocate different private number, i.e. the second private number.

[In Case of Allocating the Same Private Number]

In this case, if the first device 110 gets the first private number corresponding to the first public number of the first SIM card, the same private number could be used for the second public number of the second SIM card.

Specifically, one HLR entry for the first public number+ first IMSI and other HLR entry for the second public number+second IMSI are related to each other. For example, an identifier or indicator to present relationship between two HLR entries may be stored in the HLR 170, 171, 172 or any other server/database. Therefore, the same private number is used for both of the first public number and the second public number.

In addition, the first user of the first device 110 prioritizes the first and the second public number. Further, the first user selects the priority numbers corresponding to situations. For example, the first user selects the first public number as the priority number for calling/messaging the second user.

Meanwhile, the first device 110 prioritizes the first and the second public number. The first device 110, i.e. a controller of the first device 110, select the priority numbers based on the first user's usage patterns. For example, if the first user usually calls/messages the second user using the first SIM card, the first device 110 may select the first public number as the priority number. For another example, if the second user is a subscriber of a specific telecommunications company, the first device 110 may select the first public number as the priority number, because the first SIM card is related to the specific telecommunications company.

After that, the first device 110 sends call/message to the server 130 using the private number as the sender number via suitable network. It does not matter the first device 110 uses whether the first SIM card or the second SIM card to send the call/message. After that, the server 130 replaces the private number with the first public number. The server 130 sends the call/message to the second device 120 using the first public number as the sender number. Finally, the second device 120 receives the call/message and recognizes the first public number as the sender number.

[In Case of Allocating Different Private Numbers]

In this case, the first device 110 gets two private numbers including the first private number and the second private number according to each of the first public number and the second public number.

Specifically, one updated HLR entry for the first private number+first IMSI and other updated HLR entry for the second private number+second IMSI are related to each other. For example, an identifier or indicator to present relationship between two updated HLR entries may be stored in the HLR 170, 171, 172 or any other server/ database.

Further, the first user and/or the first device 110 prioritize the first and the second public number as described above. After that, the first device 110 sends call/message to the server 130 using the first or the second private number as the sender number via suitable network. After that, the server 130 replaces the first or the second private number with the first public number. The server 130 sends the call/message to the second device 120 using the first public number as the sender number. Finally, the second device 120 receives the call/message and recognizes the first public number as the sender number.

Therefore, the second device 120 is able to see only the one number, i.e. the first public number, of the first user even though the first user calls/messages using the second SIM card.

Figure 8:
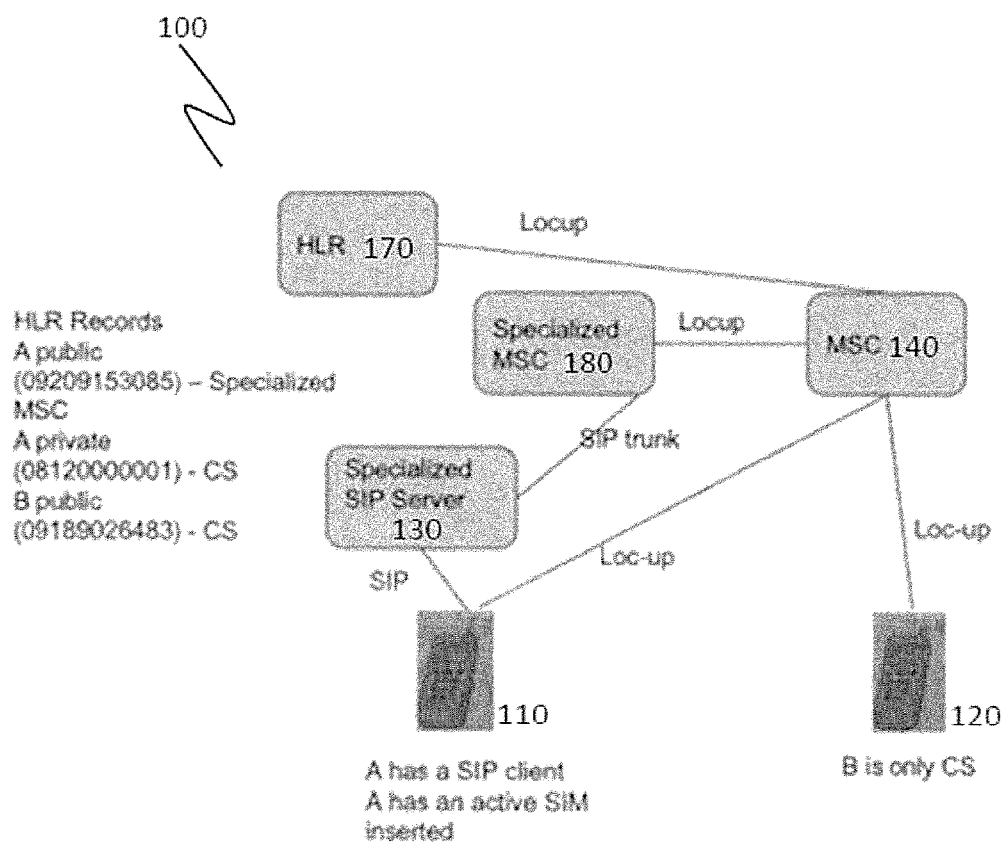
FIG. 8 illustrates an example of routing a call through specialized SIP server.

FIG. 8 illustrates an example of routing a call through specialized SIP server.

Referring to the FIG. 8, there are three components including the specialized MSC 190, the specialized SIP server 130, and the application, i.e. the client application of the present invention.

The specialized MSC 190 is able to force any calls and messages sent to the public number of the first device 110 to be sent to the specialized SIP server 130. The specialized MSC 190 does this task by sending a location update to the HLR 170. Further, the specialized MSC 190 is able to notify to the MSC 140 where the first device 110 in the system 100.

Figure 9:
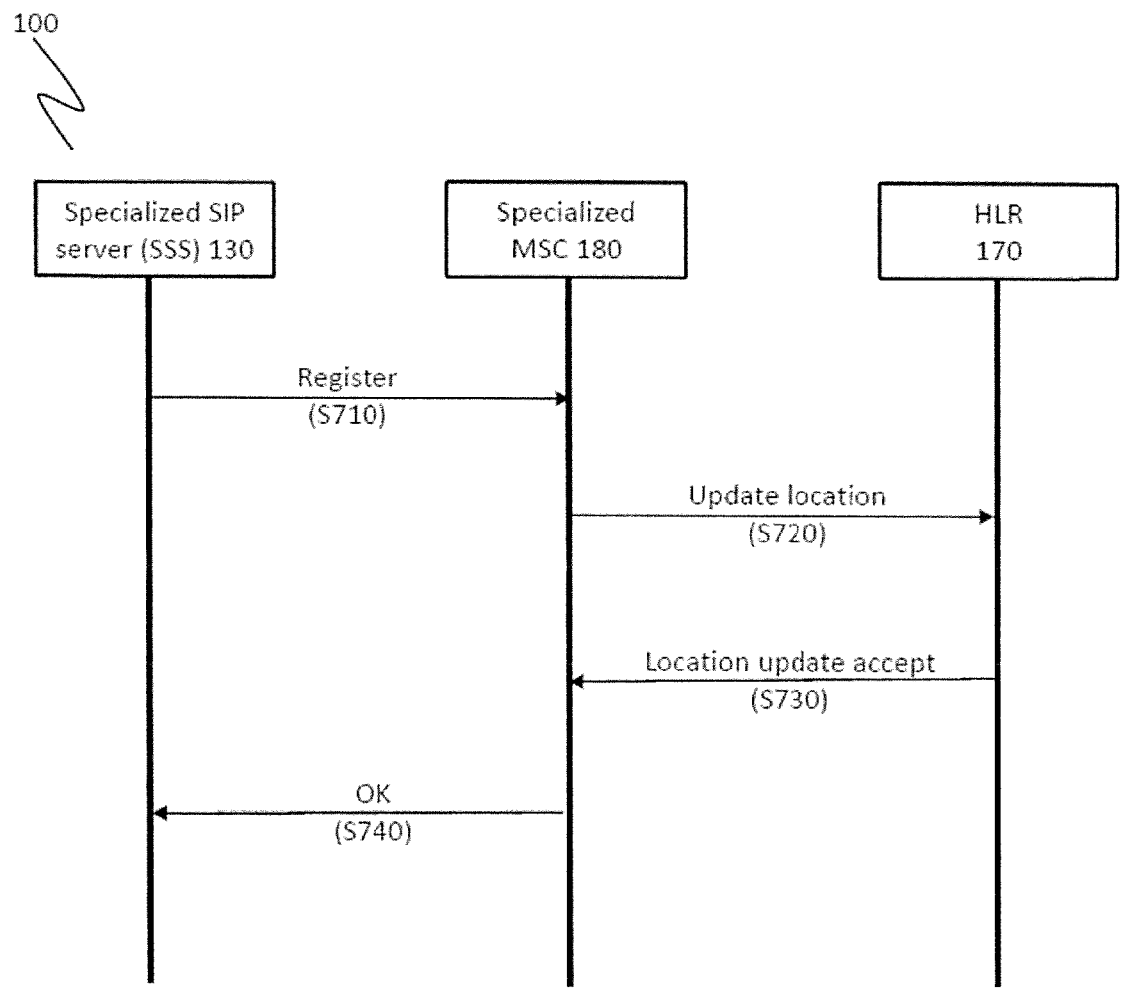
FIG. 9 illustrates a flow diagram of location update by the specialized SIP server.

FIG. 9 illustrates a flow diagram of location update by the specialized SIP server.

The specialized MSC 190 accepts messages and then sends an update location to the HLR 170. When the MSC 140 needs to route a call or SMS, the MSC 140 sends a request to the HLR 170. There are two ways in which the mobile station roaming number (MSRN) is provided back to the requesting MSC 140. In the first case, the HLR 170 stores the MSRN and responds immediately to the requesting MSC 140 with the MSRN. In another case, the HLR 170 does not store the MSRN and needs to inquire from the specialized MSC 190. In this case, the specialized MSC 190 needs to store the MSRN.

The specialized SIP server 130 provides a number masking capability for masking the private number. The specialized SIP server 130 is activated when the first device 110 uses circuit-switched features of the mobile phone, i.e. the first device 110 uses the private number to make a voice call or send SMS via the CS network. The specialized SIP server 130 is able to receive the outgoing call or SMS from the first device 110.

It should be appreciated by the person skilled in the art that variations and combinations of features described above, not being alternatives or substitutes, may be combined to form yet further embodiments falling within the intended scope of the invention.

The invention claimed is:

1. A system for communicating across multiple networks comprising an application provider including a server and a database,
    (a) wherein the application provider operable to assign a second identifier to a first device associated with a first identifier;
    (b) wherein the database of the application provider is operable to store a one-to-one relationship between the second identifier and the first identifier;
    (a) wherein the first identifier is assigned from a primary telecommunications company stored in connection with an international mobile subscriber identity (IMSI) of the first device in a home location register (HLR);
    (d) wherein the first device (110) is operable to establish connection between the first device and the server so that the first device sends a communication to the server simultaneously via both:
        (i) a circuit switched (CS) network from a plurality of first networks, using the first second identifier as a sender identifier, and
        (ii) an internet protocol (IP) network from the plurality of first networks; and
    (e) wherein the server of the application provider is operable to:
        (i) access the one-to-one relationship between the second identifier and the first identifier stored in the database;
        (ii) replace the second identifier for the first device with the first identifier for the first device after receiving the communication from the first device via the CS network and the IP network;
        (iii) select a second network from a plurality of second networks for establishing connection between a second device and the server; and
        (iii) send the communication to the second device via the selected second network using the first identifier of the first device as the sender identifier.

2. The system for communicating across multiple networks according to claim 1, wherein, when the first device signs up to an application, the application provider assigns the second identifier and updates the HLR so that the second identifier is stored in connection with the IMSI.

* * * * *